Nov. 5, 1935.  F. H. DRIGGS  2,019,599
PROCESS FOR PRODUCING CLAD METALS
Filed Feb. 6, 1932
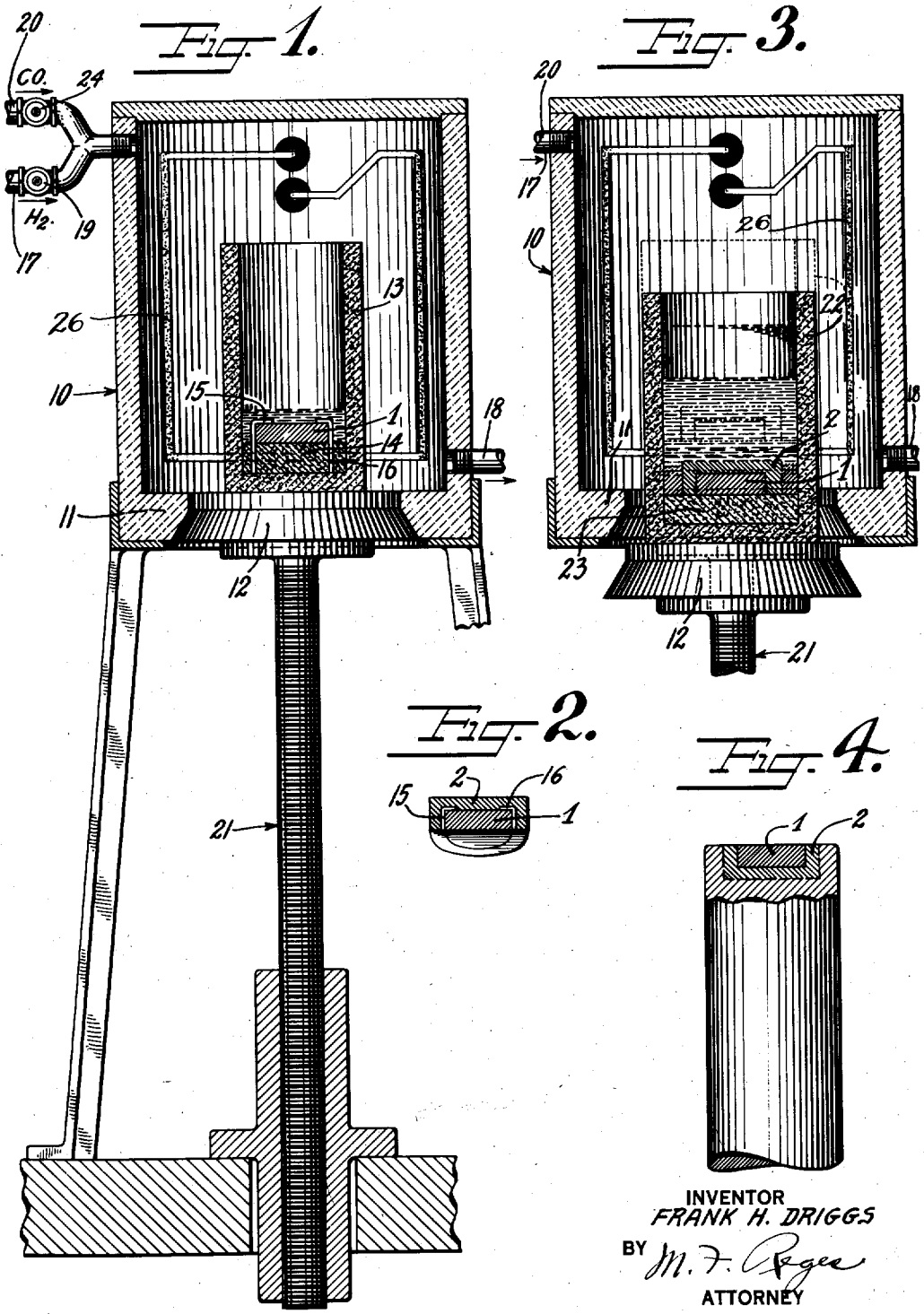
INVENTOR
FRANK H. DRIGGS
BY
ATTORNEY Patented Nov. 5, 1935

2,019,599

UNITED STATES PATENT OFFICE 2,019,599

PROCESS FOR PRODUCING CLAD METALS

Frank H. Driggs, Bloomfield, N. J., assignor to Westinghouse Lamp Company, a corporation of Pennsylvania Application February 6, 1932, Serial No. 591,300

13 Claims. (Cl. 22—204)

This invention relates to a process for firmly and permanentaly uniting unlike metals so that said metals are free from blow holes and pipes and contain no oxides.

The invention is particularly directed to a process for producing an X-ray anode of high electrical and thermal conductivity, having a target firmly imbedded therein, with the juncture between said target and the body portion of the anode being mechanically strong and having high heat and electrical conductivity characteristics and said body portion being free from oxides.

In its more specific aspect the invention is directed to improvements in X-ray anodes and to the process of making the same as set forth in the application of Louis F. Ehrke, Serial Number 591,353, filed February 6, 1932 and assigned to the same assignee as the present application. The process of producing X-ray anodes as well as the product defined in said Ehrke application, provides an X-ray anode as well as a process for producing the same which advances have found utility in the X-ray art. The process as therein disclosed is directed to placing in a furnace, a refractory metal contained in a crucible. Also contained in this crucible on the upper surface of said refractory metal is a small proportion of copper of sufficient mass, which, upon being melted, will completely coat the exterior surfaces thereof not in contact with the crucible.

This particular step is carried out in the presence of a reducing agent such as hydrogen or the like so that the refractory metal tungsten may have its surfaces kept in a substantially clean unoxidized condition during the period of its being heated when the copper is subjected to elevated temperatures to cause the latter to become fluid, flow over, wet and coat the same with a film whose thickness is about $\frac{1}{16}$ to $\frac{1}{8}$ of an inch. Thereafter, the coated refractory plate or button is allowed to cool to room temperature after which it is extracted from the hydrogen atmosphere.

It is known that when copper is subjected to an elevated temperature of sufficient magnitude to fuse the same, and when so fused is surrounded by a reducing atmosphere, as for example hydrogen, that, upon cooling thereof, it generally contains a number of blow holes or pipes. Because of the thinness of said copper coating on the tungsten, any blow holes or pipes that may be contained therein are ordinarily visible and if not directly visible may generally be ascertained by virtue of the depressions or blisters which commonly occur above the pipe and on the outer limit of this thin coating.

When the coated button is removed from the furnace and is at room temperature, any of these depressions or blisters are pierced in order to open up the invisible pipes or blow holes. This particular operation may not be necessary because of a machining operation which generally follows the extraction of the coated button from the hydrogen furnace which machining in itself is generally sufficient to open up all of these blow holes or pipes.

Thereafter, this copper coated button is placed in another crucible contained in a furnace having no appreciable quantity of reducing gas therein and generally having an ordinary air ambient surrounding the contained parts. The temperature of the copper coated button is elevated to about a temperature slightly below that necessary to cause the copper to become molten and about 1025° C. When the copper coated button is heated to this temperature, there is poured into the crucible containing the same, a relatively large quantity of commercially pure copper which is at a temperature above the melting point thereof and about 1100° C. Thereafter the total mass is allowed to cool to room temperature.

It is well known that "pure" copper ordinarily obtainable and used in commercial production contains about one to two percent. of cuprous oxide. Therefore, it is apparent that the X-ray anode produced by following out this heretofore proposed process will be comprised substantially of a target composed of a refractory material as for example tungsten or the like firmly imbedded in a copper mass with a juncture between the tungsten and the copper forming a strong mechanical union and being of high thermal and electrical conductivity characteristics with the major portion of the anode proper containing substantially the same quantity of cuprous oxide as that present in the original "pure" copper.

In order that the electrical and thermal characteristics of the anode proper as well as the mechanical characteristics may be considerably enhanced, I have developed the following invention which is an improvement over that of Ehrke heretofore briefly described. In its briefest aspect, my invention is a unique combination of the process as described by Ehrke, and the process embodied in my Patent #1,920,638 issued August 1, 1933 assigned to the same assignee as the present invention.

My invention as disclosed in the above identified application is directed to the production of oxide free metal and especially copper containing no blow holes or pipes which process involves placing the molten copper containing the oxide in a graphite crucible located in a furnace containing therein a reducing atmosphere of carbon monoxide or the like. The mass within the crucible is raised to elevated temperatures whereby to cause a fusion of the same and while in this condition the mass is cooled progressively upwardly. As the cooling takes place, the upper portion of the mass is maintained in a molten condition whereby that portion may be acted upon by the reducing agent to reduce the copper of the copper oxide present therein and also will allow any gases contained therein to be expelled therefrom.

By virtue of this progressive cooling and maintaining the upper portion of the copper in a molten condition and in the presence of a reducing agent such as for example carbon monoxide, the entire mass may be so treated that the element produced thereby is a copper element free from blow holes or pipes and containing no cuprous oxides, with the amount of copper in the produced ingot being substantially the same as that contained in the original copper oxide mass.

An object of my invention is to provide a process for producing an element composed of a refractory metal and a low-melting point metal, the low-melting point metal being free from voids or pipes and containing no oxides, the contact areas of said two metals forming a strong mechanical union having high electrical thermal conductivity characteristics.

Still another object of my invention is to provide a process for producing an element composed of tungsten and copper, the union between the tungsten and copper being mechanically strong and of high thermal and electrical characteristics, the copper being substantially free from cuprous oxides and containing no blow holes or pipes.

Other objects and advantages of my invention will become apparent from the following specification taken in conjunction with the appended drawing wherein:

Fig. 1 represents a vertical cross-section, with some parts in elevation, of a furnace employed in carrying out the first stage of my invention;

Fig. 2 represents a cross-sectional view of the product obtained following the completion of the first stage of the process;

Fig. 3 represents a view similar to Fig. 1 illustrating the second stage of my invention;

Fig. 4 represents the cross-sectional view of an X-ray anode made in accordance with the process described herein.

Although my invention is broadly directed to the process of producing clad metals, for the sake of simplicity of description and ease of understanding I will describe my invention as applied to the process of producing an X-ray anode.

According to my invention I take a rare refractory metal $1$, such as tungsten or the like, of appropriate size and for X-ray purposes, generally in the form of a button or plate and cleanse, by any suitable means, all of the surfaces thereof and especially the surfaces to be coated with a low-melting point metal of high thermal and electrical conductivity, preferably copper. These surfaces to be coated with copper are preferably subjected to an initial mechanical, chemical or other treatment so that they may be substantially freed from any oxide or other film which might prevent the tungsten and copper from forming a tenacious bond thereat.

Thereafter, in order that I may obtain a firm mechanical union between the tungsten and the metal copper which is to be united therewith, and so that the juncture between the adjacent faces of the tungsten and copper may be of high heat and electrical conductivity characteristics, the tungsten button $1$ is placed and coated with a thin layer of molten copper in an atmosphere of hydrogen.

One means suitable for carrying out this step, and employed herein so that a clear understanding of my invention may be readily ascertained, comprises a furnace $10$ composed of any suitable refractory heat insulating material. The base $11$ of this furnace has a plug $12$ of appropriate dimension fitted in an opening thereof. Supported by said plug is a crucible $13$ preferably composed of graphite and carrying in the base thereof a removable graphite plate $14$ having imbedded therein a plurality of bent spaced thin tungsten wires $15$ and $16$.

Mounted between said wires $15$ and $16$ so that the outer periphery thereof is spaced approximately $\frac{1}{16}$ to $\frac{3}{16}$ of an inch from the inner wall of said crucible $13$ is the refractory tungsten button $1$. In opposite sides of said furnace are located a plurality of conduits $17$ and $18$, the former functioning to conduct a reducing agent as for example hydrogen and carbon monoxide into the furnace and the latter to permit the egress of gases.

Thereafter an appropriate proportion of solid copper is placed upon said button and in said crucible. Only a sufficient quantity thereof, however, is preferably added thereto as is necessary upon the fusion thereof to coat said exposed surfaces of the button with a copper film $2$ measuring about from $\frac{1}{16}$ to $\frac{3}{16}$ of an inch in thickness. Prior to the heating of said metals and at this stage, hydrogen gas is admitted to said furnace through the conduit $17$. Heat is now supplied to said furnace by any suitable means as for example, high resistance glow bars $26$.

The heating operation is maintained while the hydrogen is allowed to pass through the furnace by virtue of the conduits $17$ and $18$. The crucible together with its contents may be heated to a temperature, as for example 1150° C., to cause the copper to become sufficiently molten to flow over the exposed surfaces of said button and wet said surfaces. The metallic constituents in the crucible are maintained at this temperature for a short period, the heating is removed, and the hydrogen is turned off by means of a valve at $19$. The crucible together with its contents is allowed to cool to room temperature after which the entire contents of the crucible including the removable graphite plate $14$ is extracted therefrom en masse.

Thereafter, the copper of the copper coating $2$ is preferably machined to remove any extraneous matter therefrom which may have become imbedded in the outermost surface thereof. Besides so cleaning the copper, this machining operation also serves to open up any pipes or voids contained in this coating. The next step of the process as shown in Fig. 3, comprises replacing in a crucible $22$ located within the furnace, a removable graphite plate $23$ together with the machined copper coated refractory button. Both the crucible $22$ and the graphite plate $23$ have greater diameters than the respective crucible $13$ and the graphite plate $14$.

At this stage a reducing agent as for example carbon monoxide is admitted through the conduit 20 by means of a valve 24, and the glow bars 26 are energized so as to heat the coated button to such a temperature as for example 1025° C. so that the copper coating thereof is elevated to a temperature just below the melting point of copper. I employ carbon monoxide at this stage because it has a much lower solubility factor in molten copper than does hydrogen. After the copper coated tungsten is heated to this temperature and with the carbon monoxide passing through the furnace, a relatively large proportion of commercially "pure" or other copper which may contain one to two or more percent of cuprous oxide is admitted into the crucible. The temperature of the admitted copper is now elevated to a sufficient degree that the copper may become molten.

It is apparent that the temperature necessary to render this copper in the molten condition depends on the amount of cuprous oxide contained therein. After this added copper metal containing the cuprous oxide has become molten, the crucible together with its contents is cooled in a progressively upward direction in order that the copper may freeze out in an oxide free manner without any pipes or blow holes.

The copper may be admitted into the crucible before heat is applied and may be in the form of a rod the diameter of which is slightly smaller than that of the crucible. The lower end of the rod has a recess therein of suitable dimensions so that the copper coated button may readily fit therein. This rod is inserted into the crucible so that the copper coated button 1 fits into said recess. Thereafter the crucible is heated to elevate the temperature of its contents whereby the copper rod becomes molten.

In any event and before the crucible together with its molten mass is subjected to any cooling action, it may be allowed to remain within the furnace a sufficient length of time in order to reduce at least a portion of the cuprous oxide present in that melt. The time necessary for this action is, of course, variable and dependent on the conditions within the furnace among which are the temperature of the molten mass, the amount of cuprous oxide present in the mass, the rate of contact of said molten mass with the reducing agent as well as other factors.

Thereafter, the crucible with its contained mass is slowly cooled in a progressively upward direction by actuating a jack 21 to slowly lower the plug 12 together with the crucible 22 and its contents into the air. While slowly lowering the crucible and its contained mass into the atmosphere, the temperature within the furnace is preferably maintained slightly above that necessary for keeping that portion of the mass within the furnace in the molten condition. One means that I have found suitable for this purpose is to lower the crucible into the air at a rate of about $\frac{1}{16}$ of an inch per minute and while so lowering, maintaining the temperature approximately constant within the furnace to keep in a molten condition that portion of the metal containing cuprous oxide and located within the furnace.

When carrying out this process and in accordance with my invention, the reducing agent, carbon monoxide, surrounding the greater portion of the molten mass serves to reduce the cuprous oxide present therein. As the crucible together with its contents is lowered at a slow rate from the furnace into the atmosphere the copper freezes out as large crystals of oxide free copper containing no blow holes or pipes and having their major axes extending in the direction of cooling. The major axes of these large crystals extend in the direction of the longitudinal axis of the finished product. The quantity of cuprous oxide that may have been present in that portion of the original molten mass which first freezes out is dissolved or in some other manner taken up by the molten mass thereabove. This molten mass resting on the oxide free copper is maintained at a temperature above the melting point of copper and probably containing a small proportion of cuprous oxide is acted upon by the reducing agent, carbon monoxide, to prevent the building up of cuprous oxide content therein to a percentage at least as great as that present in a eutectic mixture. Thus, as the copper freezes out, as an oxide free copper, in progressive increments in the direction of cooling, any adsorbed or absorbed gases which might form voids are expelled therefrom and any small proportion of cuprous oxide contained in the copper prior to solidification thereof is taken up by the melt and subsequently reduced by the reducing agent, carbon monoxide.

This operation of progressive cooling is carried out in this manner until the crucible and its constituents are located exteriorly of the furnace. Thus, according to my invention, there is provided an improved type of clad metal and especially an X-ray anode and a process for producing the same, which clad metal comprises a rare refractory metal as for example tungsten carried by a relatively large mass of low-melting point metal as for example copper, said copper being free from oxides and containing no blow holes or pipes, the juncture between said tungsten and copper providing a firm mechanical union having high electrical and thermal characteristics.

The clad metal or X-ray anode produced by practicing the foregoing method is claimed in my divisional application Serial No. 17,469, filed April 20, 1935.

Altho my invention has been described with some particularity this is not to be taken by way of limitation but is to be taken by way of illustration because my invention is susceptible to a number of modifications and is to be limited in scope only by the prior art.

What is claimed is:

1. The process of making clad metals consisting of a relatively high-melting point metal and a relatively low-melting point metal comprising, in the presence of a reducing atmosphere, coating said relatively high-melting point metal with a relatively thin layer of a relatively low-melting point metal of high thermal and electrical conductivity characteristics thereafter, and also in the presence of a reducing atmosphere having a lower solubility factor in said low melting point metal when in a molten condition than does said first reducing atmosphere, coating said relatively thin layer with a second layer of a low-melting point metal of high thermal and electrical conductivity characteristics whose mass is great as compared to that of said thin layer, and progressively solidifying said mass.

2. The method of making clad metals consisting of a relatively high-melting point metal and a relatively low-melting point metal of high electrical and thermal characteristics comprising, in the presence of a reducing agent, coating said relatively high-melting point metal with a relatively thin molten layer of a relatively low-melting point metal of high thermal and electrical conductivity characteristics, solidifying said thin layer, subjecting said thin layer to shearing mechanical action and thereafter in the presence of a reducing agent coating said thin layer with a second molten layer of a low-melting point metal of high thermal and electrical characteristics, whose mass is great as compared to that of said thin layer, slowly and progressively cooling said molten mass in a preferred direction while still supplying heat to the portion thereof on the forward side of said direction so that the topmost layer shall be the last to solidify, said reducing agent being in contact with said molten portion throughout substantially the entire cooling step and during cooling maintaining the oxide limit of said molten mass below the oxide present in a eutectic.

3. The method of making clad metals consisting of tungsten and copper comprising, in the presence of a reducing agent, coating said tungsten with a layer of molten copper, thereafter and also in the presence of a reducing agent, coating said copper layer with a second layer of molten copper, progressively solidifying said mass in a preferred direction while maintaining a portion thereof in a molten condition, reducing the cuprous oxide present in said molten portion, said progressive solidification taking place in said preferred direction with a portion of said mass on the forward side of said direction being the last increment thereof to solidify and during substantially the entire solidification step maintaining a reducing atmosphere in contact with said molten portion to maintain the quantity of cuprous oxide present in said molten mass below 3.6 percent.

4. The method of making slad metals of tungsten and copper comprising, in the presence of a reducing agent, coating said tungsten with a relatively thin layer of molten copper, thereafter and also in the presence of a reducing agent coating said thin copper layer with a second layer of molten copper whose mass is great as compared to that of said thin layer, progressively cooling said liquid phase in a preferred direction to progressively change the same in that direction from a liquid phase to a solid phase, maintaining a portion of the liquid phase unchanged as to phase during the progressive phase change, said progressive phase change taking place in said preferred direction whereby the solid phase is cuprous oxide-free copper containing no voids and during substantially the entire period of phase change from the liquid to the solid phase maintaining a reducing atmosphere in contact with said liquid phase to maintain the quantity of cuprous oxide in the molten portion substantially below that present in a copper-cuprous oxide eutectic.

5. The method of making clad metals consisting of tungsten and copper, comprising in the presence of a gaseous reducing agent coating said tungsten with a relatively thin layer of molten copper, solidifying the same, mechanically shear treating said thin layer, thereafter and also in the presence of a reducing agent, coating said thin layer of molten copper whose mass is great as compared to that of said thin layer, slowly and progressively cooling said molten mass in a preferred direction while still supplying heat to the upper portion thereof so that the topmost layer of the molten mass shall be the last to solidify, and during substantially the entire cooling step maintaining a reducing atmosphere in contact with said upper portion to maintain the oxide content of the molten portion substantially below the oxide present in a copper-cuprous oxide eutectic.

6. The method of producing clad metals consisting of tungsten and copper comprising, in the presence of an agent reducing to both tungsten and copper, coating said tungsten with a layer of copper, thereafter in the presence of an agent reducing only to copper, coating said first layer with a second molten layer of copper, slowly and progressively solidifying said mass in a preferred direction while maintaining a portion thereof in a molten condition, reducing the cuprous oxide present in said molten portion, said progressive solidification taking place in said preferred direction with a portion of said mass on the forward side of said direction being the last increment thereof to solidify and during substantially the entire solidification step maintaining a reducing atmosphere in contact with said molten portion to maintain the quantity of oxide present in said molten mass below 3.6 percent during the solidification.

7. The method of making clad metals consisting of tungsten and copper comprising, in the presence of an agent reducing to both tungsten and copper, coating said tungsten with a relatively thin layer of molten copper thereafter and also in the presence of an agent reducing at least to copper, coating said first layer with another molten layer of copper whose mass is large compared to that of said thin layer, progressively solidifying said mass in a preferred direction while maintaining, in a molten condition, that portion thereof on the forward side of said direction so that the topmost layer thereof shall be the last increment to solidify and during substantially the entire solidification step maintaining a reducing atmosphere in contact with said molten portion to maintain the cuprous oxide present in said molten portion below the quantity of that oxide present in a eutectic mixture of copper cuprous-oxide.

8. The method of making clad metals consisting of tungsten and copper comprising, in the presence of hydrogen, coating said tungsten with a relatively thin layer of molten copper thereafter and in the presence of carbon monoxide coating said relatively thin layer with a second molten layer of copper, progressively solidifying said mass in a preferred direction while maintaining a portion thereof in a molten condition, said progressive solidification taking place in said preferred direction with a portion of said mass on the forward side of said direction being the last increment thereof to solidify and during substantially the entire cooling step maintaining a carbon monoxide atmosphere in contact with said molten portion to maintain the quantity of oxide present in said molten mass below that present in a copper-cuprous oxide eutectic.

9. The method of forming clad metals which comprises placing a body of tungsten in a mold and, in the presence of a reducing agent, adding to said mold a molten layer of copper to coat said tungsten, thereafter and also in the presence of a reducing agent adding to said mold another layer of molten copper, progressively solidifying said molten mass upwardly from the base of the mold while maintaining the upper portion thereof in a molten condition so that the upper limit thereof shall be the last to solidify and, during the solidification, maintaining a reducing atmosphere in contact with said molten portion to maintain the cuprous oxide present in said molten mass below that present in a copper-cuprous oxide eutectic.

10. The method of forming clad metals comprising placing a body of tungsten in a graphite mold in the presence of hydrogen, adding to said mold a molten layer of copper to coat selective surfaces of said tungsten, heating said mold and its contents and, in the presence of carbon monoxide adding to said mold a second layer of molten copper whose mass is great as compared to that of said first layer, progressively cooling said mass in a direction upwardly from its base and maintaining the upper portion of said mass in a molten condition so that the topmost layer thereof shall be the last increment to solidify and during said progressive solidification maintaining a carbon monoxide atmosphere in contact with said molten portion to maintain the cuprous oxide limit of said mass below the quantity of cuprous oxide contained in a copper-cuprous oxide eutectic.

11. The method of preparing clad metals consisting of tungsten and copper comprising placing a tungsten mass in a graphite crucible and in the presence of hydrogen coating said tungsten with a thin layer of molten copper, thereafter and, in the presence of carbon monoxide, coating said thin layer with another molten layer of molten copper whose mass is great as compared to that of said thin layer, solidifying said molten mass from the base of the mold upwardly by progressively moving said mold from a sphere of elevated temperature to a sphere of lower temperature with the base thereof being substantially the first portion to be moved outside of said elevated temperature sphere, supplying heat to the upper portion of said mold during said moving to maintain the upper portion of said mass in a molten condition and maintaining a carbon monoxide atmosphere in contact with said molten portion to maintain the cuprous oxide present in said mass below that present in a copper-cuprous oxide eutectic.

12. The method of forming clad metals comprising a refractory metal and a low melting point metal, comprising placing said refractory metal in the lower part of a mold, adding said low melting point metal to said mold, rendering said low melting point metal molten, subjecting said low melting point metal while molten to a reducing atmosphere, adding more of said low melting point metal to said mold, rendering molten said last mentioned mass of low melting point metal, subjecting the entire mass of low melting point metal to a reducing atmosphere whose solubility factor in said low melting point metal is less than that of said first mentioned atmosphere, solidifying said low melting point metal from the bottom upwardly, during solidification maintaining the upper portion of said low melting point metal molten and in the presence of said second reducing agent.

13. The method of forming clad metals comprising tungsten and copper, including placing a mass of tungsten in the lower part of a mold, adding copper to said mold, rendering said copper molten, subjecting said molten copper to an atmosphere of hydrogen, adding more copper to said mold, rendering said second mass of copper molten, subjecting the entire mass of copper to a reducing atmosphere whose solubility factor in molten copper is less than that of hydrogen, solidifying said copper from the base of the mold upwardly, maintaining the upper portion of said copper molten during the solidification step.

FRANK H. DRIGGS.